Nov. 18, 1924.　　　　　　　　　　　　　　　　1,516,394
H. MARTIN
MANOMETER
Filed April 19, 1924　　　3 Sheets-Sheet 1

INVENTOR
Harold Martin
BY
ATTORNEY

Nov. 18, 1924.

H. MARTIN

MANOMETER

Filed April 19, 1924  3 Sheets-Sheet 3

1,516,394

INVENTOR
Harold Martin
BY C. G. Siggers
ATTORNEY

Patented Nov. 18, 1924.

1,516,394

UNITED STATES PATENT OFFICE.

HAROLD MARTIN, OF SOUTHSEA, ENGLAND.

MANOMETER.

Application filed April 19, 1924. Serial No. 707,734.

*To all whom it may concern:*

Be it known that I, HAROLD MARTIN, a subject of the King of Great Britain, residing at 15 Helena Road, Southsea, in the county of Hants, Kingdom of England, have invented certain new and useful Improvements in Manometers, of which the following is a specification.

This invention relates to improvements in manometers of the kind in which a float in one or both branches or legs of a U-column of mercury serves to control the position of a pivotally mounted electro-magnet disposed outside the tube or tubes and carrying a pointer or indicator.

The primary object of the present invention is to render the devices described in the specification of my prior Letters Patent Nos. 12,371 of 1915 and 165,177 more accurate and sensitive in their operation.

With the magnets of the instrument either permanently or continuously energized, it has been found in practice that the soft iron armatures which are attached by means of rods to the floats, are drawn against the sides of the tubes with sufficient strength to cause serious inaccuracy in the readings of the instrument, owing to the consequent sticking and friction. In addition, it is also known that in mercury manometers of the kind referred to, the friction between the mercury and the sides of the tubes which contain it, is also sufficient to cause an appreciable error.

Now according to the present invention I connect the electro-magnet in an electrical circuit in which it is energized by means of an intermittent direct current or a pulsating, or alternating current so that not only is the sticking of the soft iron armatures to the sides of the tube prevented, but vibration is set up throughout the instrument which serves to reduce frictional effects between the mercury and the containing tubes to a minimum.

In order that the present invention may be clearly understood and more readily carried into effect it is hereinafter described with reference to the accompanying drawings, in which:—

Figure 1:
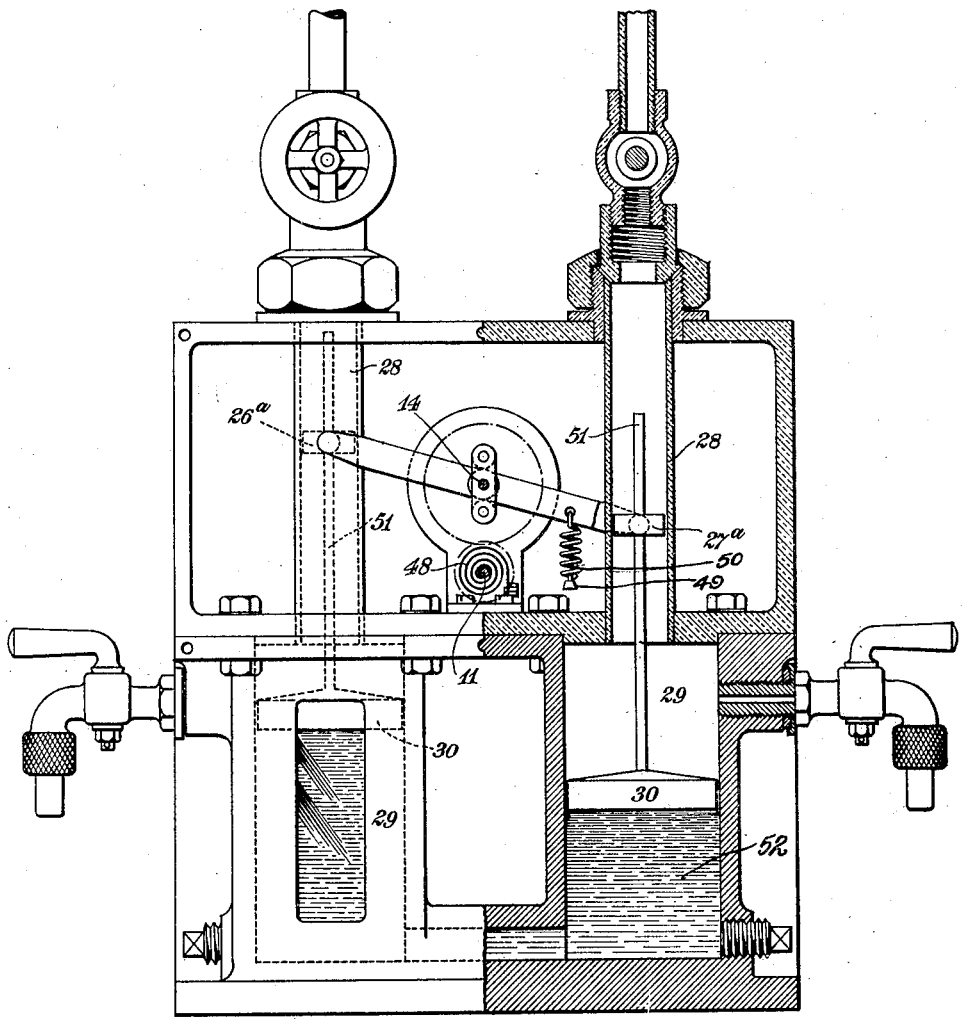
Figure 1 is a front view of a manometer constructed according to the present invention, the indicating and recording portion being removed for the sake of clearness, and the right-hand portion of the instrument being shown partly in section.
Figure 2:
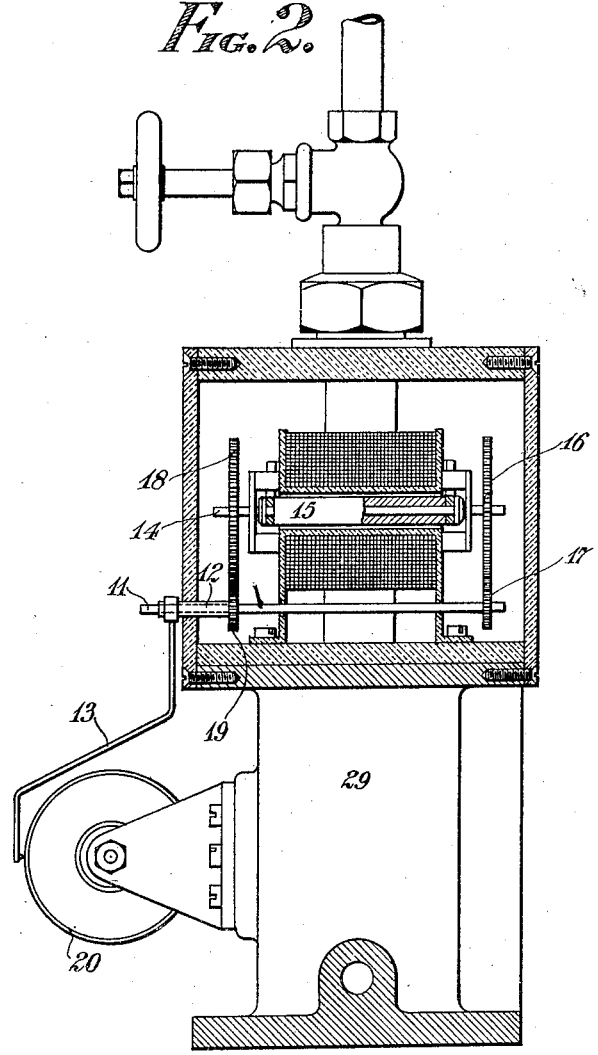
Figure 2 is a sectional side elevation.
Figure 3:
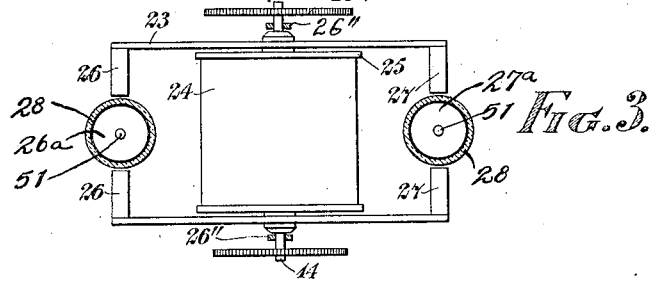
Figure 3 is a detail plan view of the instrument showing the electro-magnetic arrangements.
Figure 4:
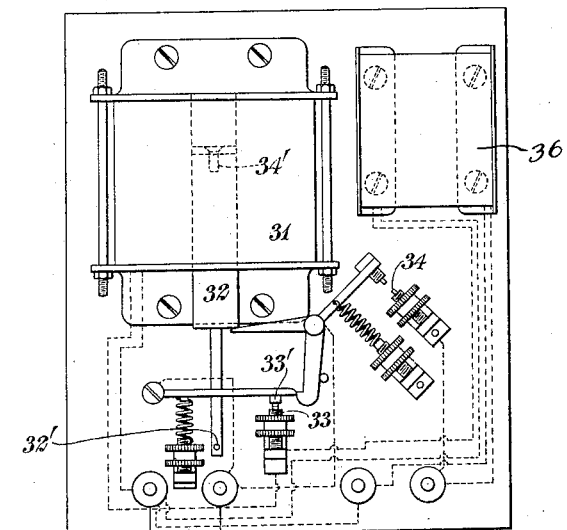
Figure 4 is a general view of a solenoid-operated interrupter such as can conveniently be used for carrying out the present invention.
Figure 5:
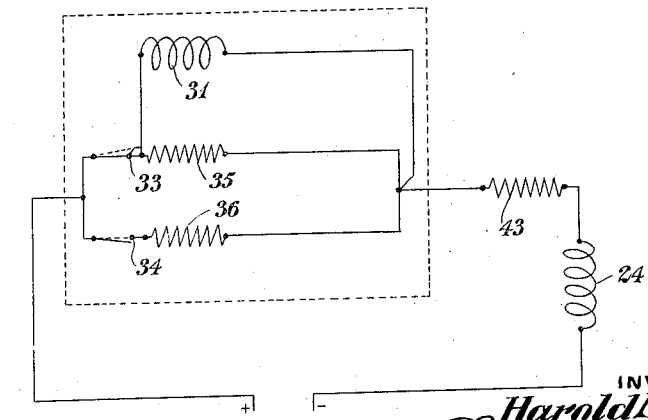
Figure 5 is a diagram showing the electrical connections of the manometer and the aforesaid interrupter.

In the accompanying drawings and referring more particularly to the constructions shown in Figures 1, 2 and 3, the manometer is arranged as a combined indicating and recording instrument, in which both a pointer spindle 11 and the hollow sleeve 12 to which the recorder pen arm is attached are both operated from the main spindle 14 to which the soft iron core 15 is connected through simple tooth gearing 16, 17 and 18, 19 respectively of different ratios. When the instrument is used, however, as a water-level indicator the recording drum 20 shown in Figure 2 and its accessories are removed, and an indicating dial with a pointer is mounted on the front of the instrument, shown in Figure 1, the train of gear wheels 16, 17 on the spindle 11 being suitably arranged to give a greater relative movement of the pointer when the instrument is used, as a water-level indicator than when used as a steam flow measuring instrument. The general construction of the instrument is substantially similar to that described in the previously referred-to patents; that is to say, the electro-magnet 23 preferably or conveniently comprises a coil 24 wound upon a former 25 supported on fixed brackets 26″ and co-axially arranged about the spindle 14 and soft iron core 15 of the magnet arms, so that the latter in effect when energized resembles in arrangement two horse-shoe magnets placed back to back, the two ends of one pair being N. and the two ends of the other pair being S. The magnets 23 and their core 15 are mounted upon the spindle 14 and are free to rotate in the spindle bearing brackets 26″. Each pair also carries at its ends pole tips 26, 26 and 27, 27 arranged to move in close proximity to the tube, thus giving a strong magnetic field through the adjacent soft iron armatures 26ᵃ and 27ᵃ inside the tubes 28, 28. One convenient manner of carrying the present invention into effect is by constructing an instrument with enlarged float chambers 29, 29 and floats 30, 30 relative to the sizes of the soft iron armatures 26ª, 27ª and the tubes 28, 28 which contain them, and by arranging suitable transmission gearing between the pointer 22 and recorder arm 13 and the electro-magnet spindle 14 in order to magnify considerably the movement of the latter; it has been found possible with suitable intermittent current supply produced by connecting an interrupter or diverter, such for instance as that shown in Figures 4 and 5, in the circuit with the energizing coil 24 of the electro-magnet, to obtain accurate readings of as small a pressure difference across the instrument as an amount equivalent to the height of a column of water only .05 of an inch in height. This increased sensitivity and accuracy not only improves the manometers for the measurement of the flow of fluids, but considerably increases their utility for measuring the height of liquids in which small variations have to be registered—such as in measuring the water levels of boilers. Beyond this, however, the sensitivity is such that the instrument can also be used with accuracy for even such low pressure work as draught measurement, and for the measurement of gas flow of low static pressures, such as those used generally for the supply of coal gas. Preferably I employ an intermittent direct current supply of a frequency or periodicity much lower than that in general use with alternating current, and conveniently the interrupter or diverter (Figures 4 and 5) consists of a small solenoid 31, the core or plunger 32 of which is arranged to make and break contact with a pair of fixed contact terminals 33, 34. The interrupter opens and closes a circuit through the manometer coil at each stroke of the interrupter solenoid plunger. The bell crank lever with its three arms is formed in one piece as by being cut out from a solid sheet of brass, and merely rocks upon a central pillar, to which a retaining screw is attached. When the interrupter is in the position shown in Figure 4, the solenoid core or plunger is at the lower end of its stroke, with the lower hinged contact 33′ closing the circuit of the solenoid core 31 with its shunt resistance 35, together with the series resistance 43 and the manometer coil 24. The solenoid coil 31 is therefore energized with the apparatus in this position, and pulls up the plunger 32, which, upon nearly reaching the upper end of its stroke causes a projecting pin 32′ which is fitted at the lower end of the lower extension rod of the plunger to lift the lower hinged contact 33″, thereby interrupting the current through the above mentioned circuit, including the solenoid 31 and the manometer coil 24. At the same time, however, the raising of the lever of the hinged contact 33′ permits the bell crank lever to rotate slightly in a clockwise direction under the action of the spring attached to it, until it closes the circuit at the contact 34. The position under these conditions is such that the circuit is now closed through the substitutional resistance coil 36, together again with the series resistance and manometer coil. The manometer coil, therefore, is thus again energized, but as the circuit of the solenoid coil 31 is broken, the solenoid core or plunger is permitted to fall under the action of gravity until it engages with the left hand projecting arm of the bell crank lever, which it then causes to rotate slightly in a counter-clockwise direction, thereby first opening the circuit at the contact 34, and immediately afterwards closing the original circuit through contact 33, which had been held open during the return stroke of the plunger on account of the end of its lever engaging with the projecting portion of the lower bell crank lever arm.

The above-mentioned cycle of operations is repeated continuously and automatically as long as current is supplied through the interrupter and manometer coil circuits. The lower left hand spring of the interrupter is provided primarily to avoid chattering of the contact 33.

As shown, a small brass screw 34′ is inserted in the core 32 of the main solenoid 31 in order to prevent sticking, and the positions of the contacts and the tensions of the springs are all readily adjustable. The non-inductive resistance 35 is provided not only as a supplementary means of adjusting the pull of the solenoid coil 31, but also to reduce the sparking at the contacts in circuits with these coils. The resistance coil 36, which is also non-inductive, is arranged to give an approximate equivalent resistance to that of the solenoid coil 31 in parallel with the non-inductive resistance 35. An additional series resistance is provided where necessary on account of increased voltage of supply.

The above arrangements prevent excessive sparking at the contacts 33, 34 of the interrupter, with the result that a cheap and simple apparatus can be designed and made for continuous operation. The frequency of interruption can be varied by altering the non-inductive desistance 35, by cushioning the movement of the solenoid plunger inside the solenoid, or by loading the solenoid plunger by means of a spring or in other suitable manner. With a relative low frequency action of the interrupter of about 6 to 10 per second, the manometer is more accurate and sensitive than at higher frequencies such as 50 or 60 per second common in ordinary alternating current supply.

To still further render the instrument sensitive and more accurate in its readings, these movements may be regulated, in conjunction with the use of intermittent direct current, or a pulsating or alternating current, by means of a spring 48 (Figure 1) which may be attached to the indicating pointer or spindle 11, or alternatively by means of a counterweight 49 attached directly to the electro-magnets 23 preferably by means of a resilient connection such as an ordinary spiral spring 50. The effect of the control spring 48 or counterweight 49 is to produce vibratory action of the whole of the moving parts of the instrument, including the soft iron armatures 26ª, 27ª with their rods 51 and floats 30. This effect is produced owing to the fact that, when the current through the electro-magnet coil 24 is interrupted, the spring 48 or counterweight 49 tends to pull the magnets 26, 26 and 27, 27 out of line with the soft iron armatures 26ª, 27ª, so that upon again energizing the coil 24, the magnet poles 26, 26 and 27, 27 are immediately pulled into line with the armatures 26ª 27ª, at the same time causing the latter, with their rods 51 and floats 30, to vibrate in a vertical direction, with consequent reactive effects upon the mercury itself 52, which reduces friction and sticking to a negligible amount. This is quite a distinct effect from that of preventing the sticking of the armatures to the sides of the tubes, which is also effected by the interrupted current supply. I prefer to use the resiliently suspended counterweigth 49 rather than the spring 48, for the main reason that the spring causes a cumulative error in the movement of the pointer which necessitates calibration, whereas the counterweight 49 only causes a zero error, which can be allowed for in setting up and testing so that calibration is not required. With either form of control, the forces exerted by spring 48 or counterweight 49 need only be sufficient to overcome the friction of the movement of the instrument, and with this arrangement an additional advantage is obtained, namely, that when the electro-magnet coil of the instrument is de-energized permanently, owing to switching off, or on account of some fault in the instrument or supply, circuit the control device ensures that the pointer is carried to one end of the scale of the instrument, thereby showing that the instrument is not operating. Stops are provided which are not shown in the drawing, to limit the movement of the electro-magnets and pointer etc. In a slightly modified arrangement I employ any equivalent means for producing the same effects, as for instance two small solenoids suitably disposed below or above the electro-magnets, which could be intermittently or alternatively energized momentarily, say when the circuit through the manometer coil is broken. This is quite a practicable arrangement, and may be used later, but either of the methods described and illustrated is preferable from the standpoint of simplicity of construction.

It will be obvious that when instruments such as those hereinbefore described are used in numbers, as in a large power station, a single motor-driven interrupter of the commutator type may more conveniently be used than a number of separately-operated interrupters.

What I claim is:—

1. A manometer of the kind referred to including a tube containing a liquid movable in response to changes of pressure, an armature movable within the tube in response to the change in liquid level therein, a pivotally mounted electro-magnet disposed without the tube and so arranged that its movement is controlled by the armature, and means for energizing the electro-magnet with an intermittent current of suitable frequency, so that sticking of the armature within the tube due to magnetic attraction is prevented.

2. A manometer according to claim 1, having suitable means tending to displace the magnet relative to the controlling armature, which, acting in conjunction with the intermittent current, sets up vibration in the moving parts so as to reduce frictional effects and produce extreme accuracy and sensitivity.

3. A manometer of the kind referred to including communicating chambers containing a liquid movable in response to changes of pressure comparatively small tubes above the chambers, floats movable within the chambers in response to change in liquid level therein, soft iron armatures supported within the tubes by the floats, a pivotally mounted electro-magnet disposed without the tubes and so arranged that its movement is controlled by the armatures, and means for energizing said magnet with an intermittent current, a pointer, and trunion gear operatively connecting said magnet and pointer.

4. A manometer of the kind referred to comprising a U-tube, the lower portion of each leg of the tube being of increased diameter, mercury in the lower portion of the tube, floats supported on the mercury, armatures of relatively small diameter supported within the restricted portion of the tube by said floats, an electro-magnet pivotally mounted between the legs and co-operating with the armatures therein, means for energizing the magnet by an intermittent current to prevent sticking of the armatures within the legs, an indicating arm, and suitable transmission gearing operable by said magnet for moving said arm.

5. In a manometer of the kind referred to and including a liquid containing U-tube having means supported by a liquid in the tube and including soft iron armatures, a movably mounted electro-magnet cooperating with the armatures, means for energizing said magnet with intermittent current of suitable frequency, so that sticking of the armatures in the tubes due to magnetic attraction is prevented.

6. In a manometer of the kind referred to and including a liquid containing U-tube having soft iron armatures supported by the liquid in the tube and a movably mounted electro-magnet, means for energizing said magnet with an intermittent current so that the position of the magnet is controlled by the armatures when the magnet is energized, and means biasing the magnet to a given position whereby the armatures and magnet are caused to vibrate.

In testimony whereof I have hereunto signed my name.

HAROLD MARTIN.